May 7, 1968 R. J. ROCKWELL 3,382,450

NEUTRALIZING CIRCUITS FOR PUSH-PULL AND CATHANODE STAGES

Filed Nov. 12, 1965 4 Sheets-Sheet 1

INVENTOR.
RONALD J. ROCKWELL
BY Alden D. Redfield
Charles M. Hogan
ATTORNEYS.

INVENTOR.
RONALD J. ROCKWELL
BY Alden D. Redfield
Charles M. Hogan
ATTORNEYS.

May 7, 1968 R. J. ROCKWELL 3,382,450

NEUTRALIZING CIRCUITS FOR PUSH-PULL AND CATHANODE STAGES

Filed Nov. 12, 1965 4 Sheets-Sheet 3

INVENTOR.
RONALD J. ROCKWELL

BY Alden D. Redfield
Charles M. Hogan
ATTORNEYS.

INVENTOR.
RONALD J. ROCKWELL
BY Alden D. Redfield
Shares M. Hogan
ATTORNEYS.

United States Patent Office 3,382,450

Patented May 7, 1968

3,382,450
NEUTRALIZING CIRCUITS FOR PUSH-PULL AND CATHANODE STAGES

Ronald J. Rockwell, Cincinnati, Ohio, assignor to Avco Corporation, Cincinnati, Ohio, a corporation of Delaware Filed Nov. 12, 1965, Ser. No. 507,429
4 Claims. (Cl. 330—77)

ABSTRACT OF THE DISCLOSURE

In prior art balanced vacuum tube circuits the voltages available at the anode are generally not adequate in magnitude to provide adequate neutralization. Here there is disclosed a balanced vacuum stage having a cathode reactor. An autotransformer has its primary capacitively coupled to the reactor and its end turns individually coupled by neutralizing capacitors to the grid. The autotransformer is proportioned to produce secondary voltages which are adequate for neutralization.

The present invention relates to neutralizing circuits and particularly to such circuits as applied to push-pull and cathanode stages.

The purposes and functions of neutralizing circuits are well known, and they are commonly described in the literature, as for example in the following: Radio Engineers Handbook, Terman, pp. 467–472, McGraw-Hill Book Company, Inc., New York, 1953; the Electronic Engineering Handbook, Batcher and Moulic, pp. 206–213, Electronic Development Associates, 125 E. 46th St., New York, N.Y. 10017, 1944.

Before stating the objects of the invention, reference will first be made to the problem which the invention is intended specifically to solve and to the disadvantages and limitations of various solutions attempted in the past.

In broadcasting transmitting stations which include high power, wide band audio amplifying systems utilizing high power triodes, the difficulties caused by input capacity are compounded. The principal problem is that presented by grid-anode capacity. Due to the gain of a triode, the effective input capacity confronted during normal operation is many times that which may be statically measured, and it causes serious audio signal degeneration.

In a sense the input capacity causes degeneration because a positive excursion, for example, on the grid is effectively reduced by the substantially larger negative anode excursion which is coupled back to the grid through grid-anode capacity, from which it follows that an equal but oppositely polarized voltage coupled to the grid through a capacity equal to the tube input capacity will regenerate the grid by an amount equal to the aforesaid degeneration and will therefore greatly extend the band width of a triode stage.

Considering a conventional push-pull amplifier, for example, and assuming a positive grid excursion of 3 kilovolts, perfect phase opposition between grid and anode voltages, and a gain of a triode appropriate to cause an excursion of −10 kilovolts in the anode circuit, then the effective voltage existing across the input capacitance is 13 kilovolts (FIG. 1). Thus the input capacitance effectively represents a condenser which is repetitively charged to 13,000 volts, and it will be understood how this charging current causes signal degeneration.

It is known in the art that if in some manner there can be found an oppositely phased voltage effectively to apply across the input capacitance, then the undesired effects of input capacitance may be neutralized. Another way of expressing the same thought is to counterbalance the charging current by an equal and opposite current flow back into the grid circuit. Now, if a conventional push-pull circuit be examined, let the excursions mentioned above relate to one of the triodes 17 in a push-pull stage (FIG. 4). Then in that event the excursion on the anode 19 of the other triode 18 will be 10 kilovolts positive, and that anode has been suggested in the prior art as an appropriate source of neutralizing voltage. That is, the feedback energy for grid 20 is obtained from the anode of the other triode. However, there is only a 7 kilovolt difference in potential existing, by reason of the signal excursion, between said anode 19 and the grid 20 under consideration, and this differential is not sufficient.

All excursions herein discussed are peak voltages.

The discussion of FIG. 5 set forth below reveals this insufficient neutralization which is only 10/16 of the amount required. Now the percentage of neutralization increases as the gain of the tubes increases. At a given frequency the alternating current grid current and the oppositely polarized alternating current neutralizing current can be made equal by increasing the size of the neutralizing condenser. At higher frequencies, however, the neutralizing current will then be greater than the alternating current grid current and the push-pull stage becomes so regenerative as to invite oscillation. Wide band neutralization is therefore impractical in the conventional push-pull circuit, due to the fact that the fed back neutralizing voltage is insuffcient by an amount equal to at least twice the magnitude of the grid excursion.

Accordingly, in conventional cross-neutralizing circuits, the neutralizing capacitor is made sufficiently large so that the amount of energy coupled back to the grid circuit of the triode under consideration equals the energy loss through the charging of the grid-plate capacitance. This conventional cross-neutralization technique is explained in Handbook of Basic Circuits, Matthew Mandl, Section C–14, The MacMillan Company, New York, 1956. Due to the insufficiency of the above-mentioned voltage differential (6000 volts being the amount of this insufficiency in the case being discussed), prior art cross-neutralization represents only an approach toward the desired solution, when push-pull amplifying stages are used. It will be shown below that the difficulties with respect to proper neutralization are compounded when cathanode circuits, as defined below by reference to the patent literature, are considered.

In accordance with the invention those improvements are made which accomplish complete neutralization and these improvements are based on the concept, believed to be taught for the first time herein, that the insufficiency in neutralizing voltage which characterized prior art push-pull circuits is equal to at least twice the amount of the grid excursion.

The principal object of the invention is to provide push-pull and cathanode circuits so arranged that the voltages employed for neutralization purposes are of adequate amplitude.

Another object of the invention is to teach, quantitatively, the magnitudes of voltages required to accomplish proper neutralization in wide band amplifier stages of the type under consideration.

A specific and yet important object of the invention is to provide a fully neutralized cathanode circuit. Cathanode circuits are shown and described in the following representative U.S. Patents: Rockwell Patent 2,875,413, issued Feb. 24, 1959; and Rockwell Patent 2,763,732, issued Sept. 18, 1956.

For a better understanding of the invention, together with other and further objects, advantages, and capabilities thereof, reference is made to the following description of the accompanying drawings, in which.

Figure 1:
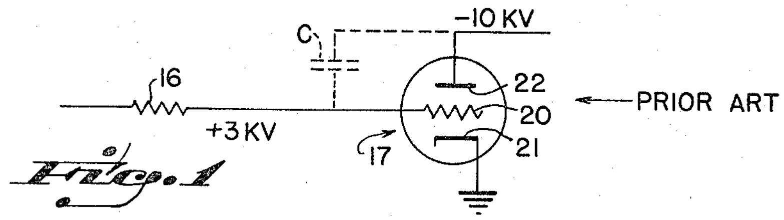
FIG. 1 is a prior art triode circuit showing the capacitive effect of the grid and plate.
Figure 2:
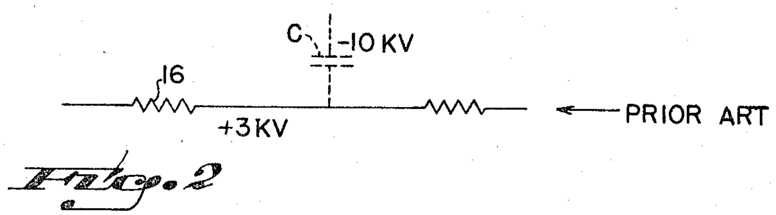
FIG. 2 is a prior art showing that this effect is equivalent to a capacitance.
Figure 3:
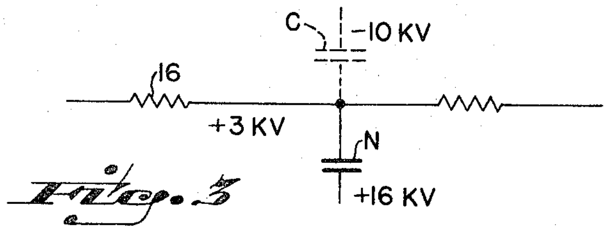
FIG. 3 shows a prior art objective not practically realized.

Referring now to FIG. 1, it shows a triode 17 having a cathode 21, grid 20, and plate 22. The gain of the triode is assumed to be such that a positive excursion of 3000 volts on the grid causes a negative excursion of 10,000 volts on its plate. The input capacitance is designated by the letter C. It will be seen from an examination of FIG. 2 that the effect of the anode-grid capacitance at its peak charge is substantially that which would be the case if it were a lumped circuit capacitor having −10,000 volts applied to one terminal and +3000 volts applied to the other. That is, the peak potential to which the effective capacitor C is charged is 13,000 volts. Now referring to FIG. 3, it will be seen that if the grid 12 could be coupled by a capacitor N—i.e., a neutralizing capacitor—to some source of potential at 16,000 volts, then the energy used for charging the input capacitance would be fed back from that source so that the input signal to the grid would not be degenerated in any way by reason of charging the input capacitance of the tube.

Figure 4:
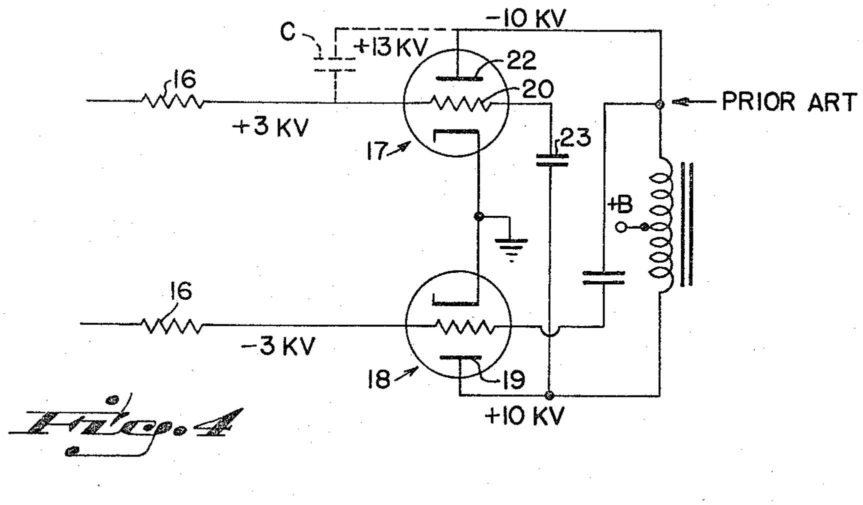
FIG. 4 is a prior art push-pull circuit with cross-neutralization.

Let reference now be made to FIG. 4 with this requirement in mind, and bearing in mind that a peak voltage differential of 13,000 volts exists across the grid-plate capacitance C of triode 17. Let the push-pull circuit shown in FIG. 4 include another triode 18 arranged in a push-pull arrangement with triode 17. Now if the excursion on the anode of triode 17 reaches a peak of −10 kilovolts, then the excursion on the anode of triode 18 reaches a peak of +10 kilovolts, and therefore the last-mentioned anode provides a convenient point of potential to which the grid 20 of the triode 17 is coupled by a neutralizing capacitor 23.

The discussion just completed postulates a resistive input 16 in each instance and constitutes one way of looking at the evolution of cross-neutralization—i.e., a push-pull circuit in which the anode of each triode is capacitively coupled to the grid of the other for purposes of neutralization.

However, still referring to FIG. 4, it will be observed that there is effectively a 13 kilovolt peak differential across the grid-plate capacitor C, whereas there is only a 7000 volt peak differential across the neutralizing capacitor 23, so that the neutralization would be inadequate without appropriately providing for an increase in the capacity of capacitor 23 to take care of the energy involved. But since the capacitive reactance decreases with increased capacity the cross-neutralization expedient is not satisfactory for wide band operation.

Figure 5:
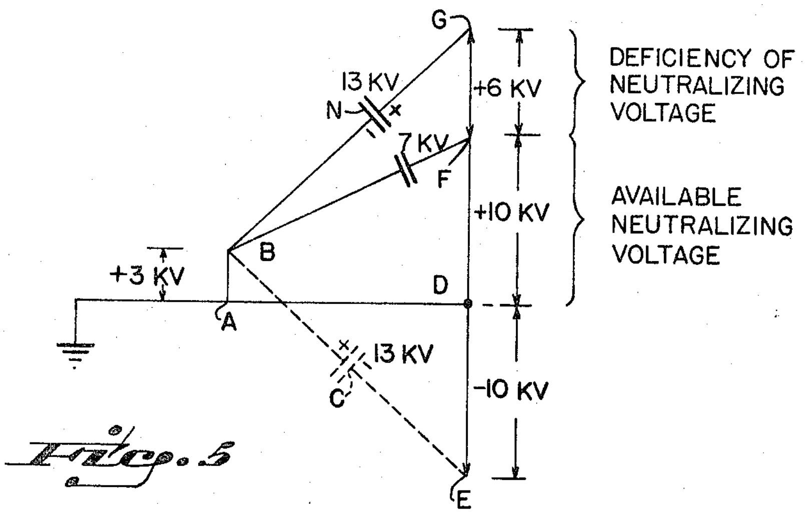
FIG. 5 is a diagram used in showing a limitation of cross-neutralization in prior art push-pull circuits.

Now making reference to FIG. 5, the arrow-bearing lines there shown are not vectors but represent voltage values. For example, the line A–B represents the positive excursion of 3000 volts on the grid 20 of triode 17. The line D–E represents the accompanying negative excursion of 10,000 volts at plate 22. Again the input capacitance of triode 17 is represented by a symbol C, and it will be seen that there is effectively a 13,000 volt stress across it. Now, for neutralizing purposes what is desired is a neutralizing capacitor N which likewise has a 13,000 volt potential across it, and this is with reference to the grid desired to be neutralized. The line D–F represents the positive excursion available at the anode 19 of triode 18, and it will therefore be seen that a neutralizing capacitor, located per element 23 in FIG. 4, has a voltage differential of only 7000 volts across it (represented by line B–F of FIG. 5) and is accordingly 6000 volts short (per line F–G of FIG. 5) of the desired neutralizing voltage.

Figure 8:
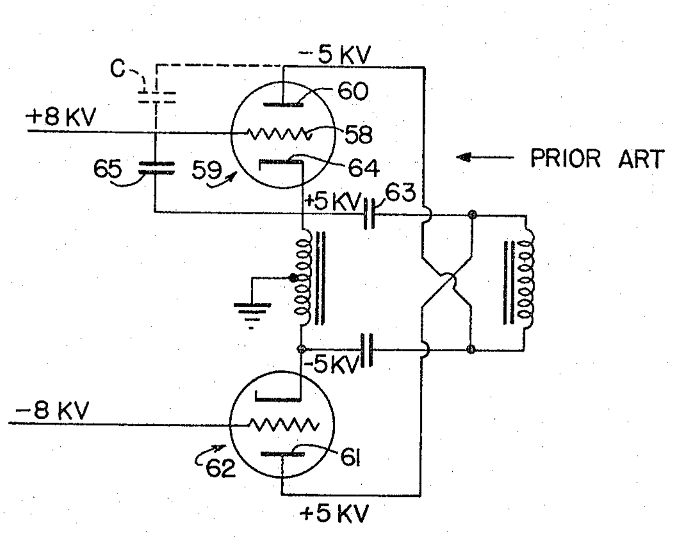
FIG. 8 is a prior art cathanode circuit with a hypothetical cross-neutralization feature added.

Referring now to the cathanode circuit of FIG. 8, the situation is even worse if the same voltage differential of 10,000 volts between plate and cathode of each triode be assumed. FIG. 8 shows a cathanode circuit in which an excursion of +8 kilovolts on the grid 58 of a triode 59 produces a negative excursion of 5000 volts on the plate 60. Again there is effectively a 13,000 volt differential across the input capacitance C, and now the problem is to find a point which as characterized by a 13,000 volt differential with respect to grid 58 and is more positive than grid 58. Such a point is nowhere to be found in the FIG. 8 circuit. If a neutralizing capacitor 65 now be coupled from the plate 61 of triode 62 back to grid 58, it only provides more capacitance to be charged and aggravates the signal degradation complained of in the first place. It will of course be understood that, in the prior art cathanode circuits, anode 61 and cathode 64 are coupled together by capacitor 63. The point represented by the anode of tube 62 is 16,000 volts lacking in the required magnitude, as may be shown by an inspection of FIG. 9.

Figure 9:
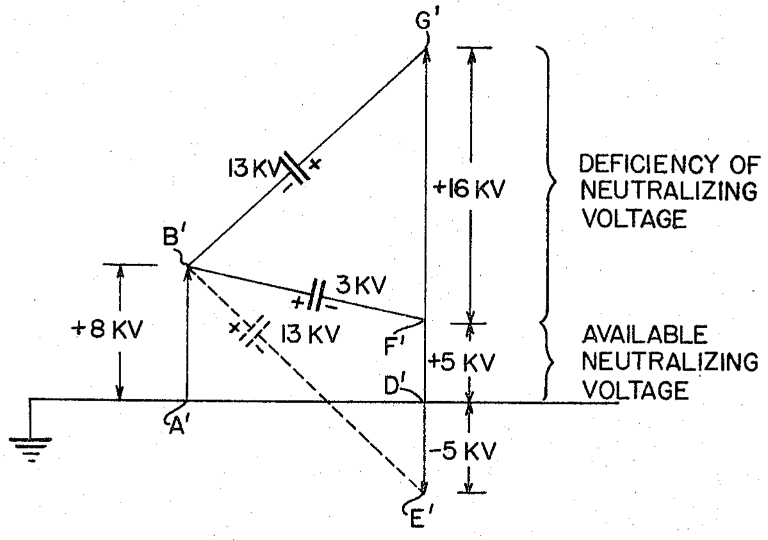
FIG. 9 is a diagram explaining the impracticality of cross-neutralization of the prior art cathanode circuit.

In FIG. 9 the significance of the lines is as follows:

| | |
|---|---|
| Excursion of grid **58** | A'B' |
| Voltage across input capacitance | B'E' |
| Voltage across neutralizing capacitor **65** | B'F' |
| Excursion of plate **61** | D'F' |
| Deficiency in neutralizing voltage | F'G' |

Figure 6:
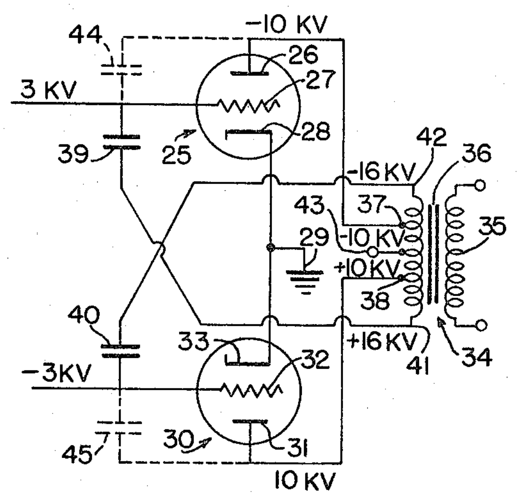
FIG. 6 is a push-pull circuit with autotransformer neutralization in accordance with the invention.
Figure 7:
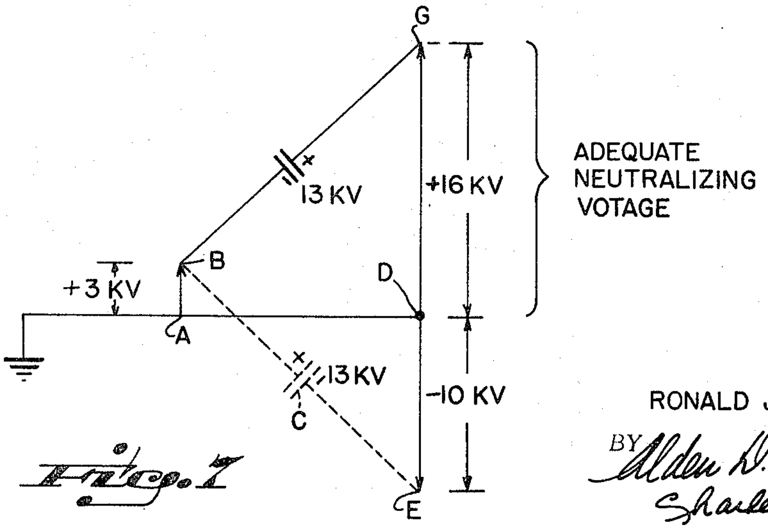
FIG. 7 is a voltage diagram showing how the objectives of neutralization are achieved with the FIG. 6 circuit.

Reference is now made to FIG. 6, a push-pull stage including a preferred embodiment of the invention. The FIG. 6 stage is generally conventional except in the respects herein noted. This stage comprises a triode 25 having an anode 26, a gride 27 and a cathode 28 grounded at 29. Also a triode 30 having an anode 31, a grid 32 and a cathode 33 grounded at 29. Particular attention is invited to the output transformer 34 which comprises a conventional secondary 35, an iron core 36 and a tapped primary. This primary is tapped at 37 and 38 and these taps are connected to the anodes 26 and 31, respectively. Please note the step-up end turns provided in accordance with the invention, between points 37 and 42 and 38 and 41. The neutralizing capacitors 39 and 40 are connected, respectively, as follows: capacitor 39, between grid 27 and primary end terminal 41; neutralizing capacitor 40 between grid 32 and end terminal 42 of the primary. By reason of the autotransformer action existing in the tapped primary the voltages at end terminals 42 and 41 are larger than those existing at the anode-connected taps 37 and 38 by an amount adequate to overcome the prior art deficiency in neutralizing voltage. If now reference be made in the line B–G in FIG. 7, that line represents the effective stress across the neutralizing capacitor 39 of 13,000 volts. It will be understood that the voltage at point 41 is 16,000 volts under the conditions assumed, the extra turns between tap 38 and end terminal 41 providing the additional 6,000 volts. Similarly, the extra turns between tap 37 and end terminal 42 provide the 6,000 volt increment required for neutralizing condenser 40. The voltage at terminal 42 is −16,000 volts. Therefore, in accordance with the invention, instead of utilizing the anodes for purposes of cross-neutralization, the present invention provides for that purpose, by additional end turns and autotransformer action, points of stepped up voltage which render the nuetralizing adequate without utilizing such large-capacity neutralizing condensers as to render neutralization impractical or practical only within a very narrow band.

It will of course be understood that the primary is center tapped at 43 and the center tap is connected to the positive terminal of a source of anode voltage and space current, further that the reference numerals 44 and 45 represent the input grid-anode capacity effects to be neutralized.

Now the discussion of the push-pull stages of FIG. 6 postulates that in practice no great difficulties would be experienced in designing an output primary with additional end turns or in providing taps as desired and indeed such conditions are frequently realistic. However, in broadcasting practice, particularly as it involves large audio power, heavy currents and other rigorous requirements pertinent to clear channel stations, the transformers and reactors available as voltage sources are very large, encased and cumbersome, generally weighing tons. It is not practical to adapt such reactors and transformers to the supply of the required neutralizing voltages, in accordance with the principles on which this invention is premised. This is particularly true of high fidelity cathanode circuits as used in amplitude modulation broadcasting stations.

Figure 10:
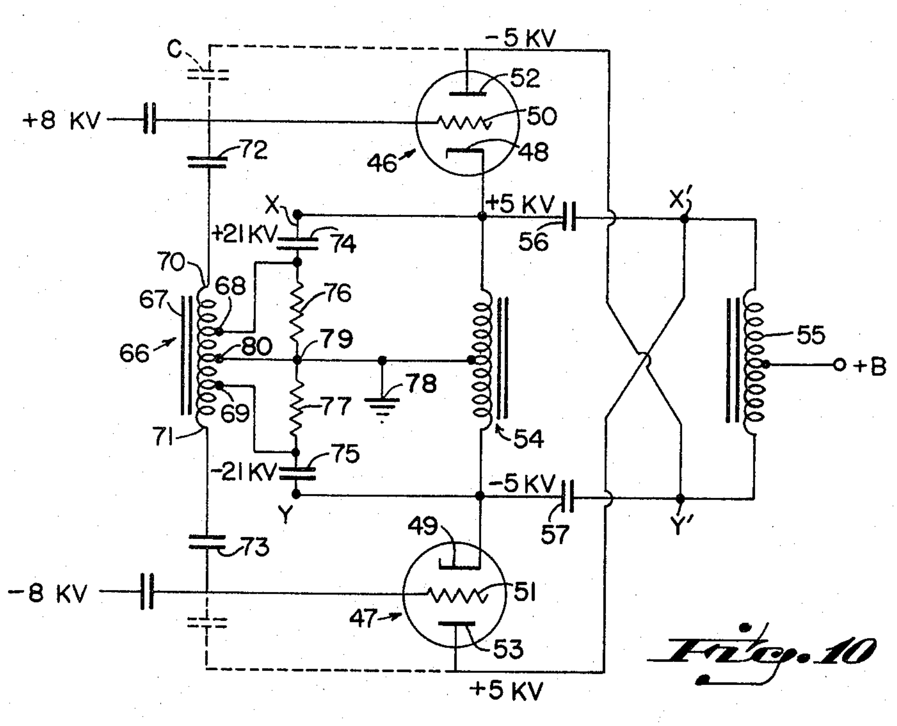
FIG. 10 is a cathanode circuit with a neutralization feature in accordance with the invention.

In FIG. 10 there is illustrated a cathanode circuit comprising triodes 46 and 47 having cathodes 48 and 49, grids 50 and 51 and anodes 52 and 53, respectively, together with the usual iron core cathode reactor 54, iron core anode reactor 55, and coupling capacitors 56 and 57 for coupling the terminals of the cathode reactor to those of the anode reactor thereby to supply an output which comprises components supplied by both anodes and both cathodes. Now both of the reactors 54 and 55 are very large and cumbersome and it is not practical to add taps or additional turns to them. They are utterly unsuitable for neutralizing purposes.

It has been shown from a consideration of FIG. 9, that under the conditions assumed, a neutralizing voltage source of 21 kilovolts is required. Such a voltage is nowhere to be found in a prior art cathanode circuit operating under these conditions, and, further, in actual broadcasting practice the anode and cathode reactors, which roughly correspond to the output transformer portion of a push-pull stage, are unavailable and not adapted to modification for neutralizing purposes. These considerations add up to a formidable problem of providing wideband neutralization where it is most needed.

Now, further in accordance with the invention there is coupled to one of these reactors, for example the cathode reactor 54 of FIG. 10, an autotransformer 66 which includes an iron core 67. The primary of this transformer is defined by the turns between taps 68, 69. The secondary of this transformer is defined by end terminals 70 and 71, which end terminals are coupled to grids 50 and 51, respectively, by neutralizing capacitors 72 and 73, respectively. The primary of this transformer is coupled to the cathode reactor by capacitors 74 and 75, each inserted between one of the taps 68 or 69 and the corresponding individual end terminals of cathode reactor 54. The primary is resistively loaded by a voltage divider network comprising resistors 76 and 77, and a symmetrical ground 78, conventional for cathode reactors, is connected to the junction of these resistors at 79 and to a center tap 80 on the autotransformer 66. It will be understood from the foregoing that the leads X and Y could be removed and connected to the terminals X′ and Y′ of anode reactor 55. In either case the capacitors 74 and 75 provide any blocking that may be desired.

Figure 11:
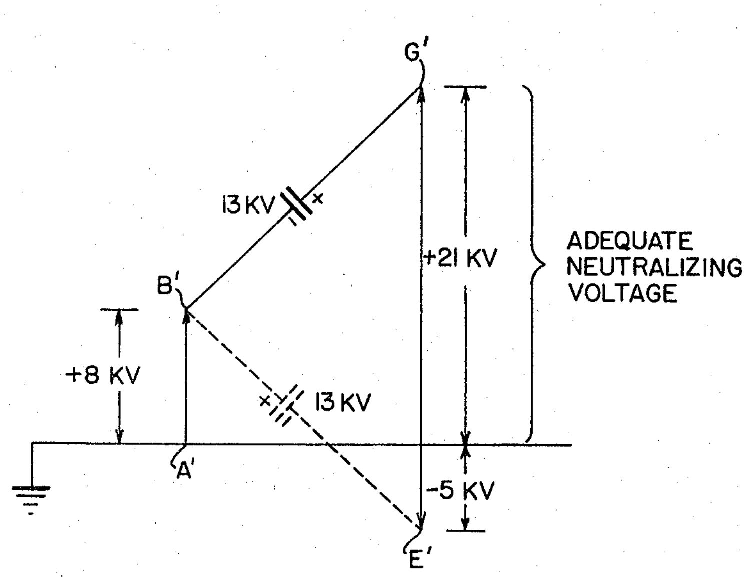
FIG. 11 is a diagram explaining how proper neutralization is achieved with the FIG. 10 embodiment of the invention.

Now, at tap 70 a 21,000 volt potential is available, and therefore the voltage across neutralizing capacitor 72 is 13,000 volts. This precisely counterbalances the undesired input capacitance C, as will be appreciated by an inspection of FIG. 11, in which the line A′–B′ represents the excursion on grid 50, the line B′–E′ represents the voltage across the input capacitance C, and the line B′–G′ represents a voltage of equal magnitude across the neutralizing capacitor 72.

Similarly, the number of turns between tap 69 and end terminal 71 of the autotransformer 66 is such as to provide a sufficient voltage step-up so that the voltage across capacitor 73 is equated to the voltage across the input capacitance of triode 47.

Thus it will be seen that the invention solves the problems discussed in connection with its objectives.

The coupling capacitors 74, 75 used in the FIG. 10 embodiment may be so small in capacity as practically to constitute open-circuits below 5000 cycles. Signal degeneration below that frequency is negligible and the need for neutralization below 5000 cycles is therefore negligible.

A particular advantage of the FIG. 10 improvement resides in the fact that the autotransformer 66 may be quite small and readily accessible and is characterized by design flexibility to meet specific requirements and conditions.

While there have been shown and described what are at present considered to be the preferred embodiments of the invention, it will be understood by those skilled in the art that various modifications and changes may be made therein without departing from the scope of the invention as defined by the appended claims.

I claim:

1. In a balanced vacuum tube stage of the type which includes anode and cathode reactors and a pair of vacuum tubes, each having an anode and a grid characterized by undesired input capacitance and a cathode, and arranged in a cathanode configuration, the improvement which comprises magnetic circuit means coupled to one of said reactors and neutralizing capacitors individually coupled between said magnetic circuit means and said grids, the magnetic circuit means being proportioned and arranged to provide neutralizing voltages which oppose and are equal in magnitude to the voltages produced by applied signals across the grid-anode input capacitances of said tubes.

2. The improvement in accordance wtih claim 1 in which the magnetic circuit means comprises a relatively small and readily accessible autotransformer having a primary coupled to one of said reactors and a secondary connected to said neutralizing capacitors.

3. The improvement in accordance with claim 2 in which the autotransformer is coupled to the anode reactor.

4. The improvement in accordance with claim 3 in which the autotransformer is connected to said cathode reactor.

References Cited

UNITED STATES PATENTS

| | | | |
|---|---|---|---|
| 1,668,240 | 5/1928 | Green | 330—76 X |
| 1,677,090 | 7/1928 | Hull | 330—79 |
| 1,848,912 | 3/1932 | Taylor et al. | 330—79 |
| 1,882,128 | 10/1932 | Fearing | 330—77 |

ROY LAKE, *Primary Examiner.*

J. B. MULLINS, *Assistant Examiner.*